United States Patent Office 3,649,567
Patented Mar. 14, 1972

3,649,567
METALLIZING COMPOSITIONS WHICH YIELD COATINGS HAVING UNOBJECTIONABLE BACKSIDE COLOR
Oliver A. Short, Wilmington, Del., assignor to E. I. du Pont de Nemours and Company, Wilmington, Del.
No Drawing. Filed Apr. 30, 1969, Ser. No. 820,635
Int. Cl. H01b 1/02; C03c 17/00
U.S. Cl. 252—514
12 Claims

ABSTRACT OF THE DISCLOSURE

The metallizing compositions comprise silver, inorganic binder and a salt from the group consisting of alkali metal salts, alkaline earth metal salts and mixtures thereof, wherein the salts are present in amounts which yield from 0.1–10% of the metal ion upon firing. These metallizing compositions are applied to glass substrates and fired to produce metallic coatings having a silvery gray color on both the back and front side of the glass, thus eliminating the previously objectionable backside color (e.g., tan-deep olive).

BACKGROUND OF THE INVENTION

Silver metallizing compositions have been applied to glass surfaces in fine line patterns. When an electric current is applied to the fine line patterns, the electric current develops heat in the lines and thus provides a means for heating the glass surface. More particularly, the automotive industry has produced back window demistors or heaters by applying silver stripes approximately 20–30 mils wide on the back window. The silver stripes are connected in parallel relationship and when an electric current is applied, the silver stripes act to remove mist, fog, and thin layers of ice from the back window of the automobile. In addition, some automobile manufacturers have provided a thin silver stripe on the front windshield to act as a radio antenna.

There have been several requirements for metallizing compositions which are to be used in these applications. They are as follows:

(1) Low electrical resistivity of the fired metallization;
(2) The fired metallizations must be solderable so that leads can be attached;
(3) The fired metallizations must have good adhesion to the substrate;
(4) The metallizations must not degrade or lower the strength of the tempered window glass below a standard acceptable level.

While the present silver metallizations now being used meet the above requirements, the fired metallizations produce a backside color which ranges from tan to deep olive. This backside color is very objectionable in appearance and has caused much distressed in the automobile industry. However, for lack of a solution to this problem, the present silver metallizations had to be used.

It is the object of this invention to provide improved metallizations which possess all of the above necessary properties without the objectionable backside color.

SUMMARY OF THE INVENTION

This invention relates to metallizing compositions comprising (A) 40–95% by weight silver, (B) 2–20% by weight inorganic binder, and (C) a salt selected from the group consisting of alkali metal salts, alkaline earth metal salts, and mixtures thereof, said salt being present in amounts which yield, based on the weight of the metallizing composition, 0.1–10% of the metal ion upon firing. Also within the scope of the invention are glass substrates having the above metallizing compositions fired thereon. In particular, windshields having these metallizations fired thereon without any backside color are the most preferred embodiments of this invention.

DESCRIPTION OF THE PREFERRED EMBODIMENTS

The crux of the present invention resides in the addition of an alkali metal salt, an alkaline earth metal salt or a mixture thereof to a silver metallizing composition. While this invention is not based on any particular theory, it is theorized that the backside color resulting from firing the present metallizations is due to the migration of silver ions into the glass surface to produce a silver stain, i.e., brown. In this invention, the ions from the added metal salts migrate into the glass surface in preference to the silver. Thus, these metals either displace or prevent the silver from migrating into the glass surface and consequently, eliminate the backside brownish color of the fired silver metallizations. Exemplary compounds of the various metals include sodium carbonate, sodium bicarbonate, sodium oxalate, sodium chloride, sodium sulfate, sodium borate, sodium silicate, lithium carbonate, sodium plumbate, sodium bismuthate. Since all of these salts do not work equally as well, the preferred salts include sodium carbonate, sodium oxalate and mixtures thereof.

The presence of some amount of an alkali metal salt, alkaline earth metal salt or a mixture thereof in the metallizing composition aids in the elimination of the backside color. However, it has been found that the amount of metal salt utilized is dependent upon the amount of metal ion which is freed upon firing. That is, the amount of metal ion which becomes available to migrate into the glass surface when the metallizing composition is fired onto the glass surface. In general, any amount of the specified metal salts which yield 0.1–10% of the metal ion upon firing is operable. It is pointed out that the amount of free metal ion is based upon the weight of the metallizing composition. A preferred range has been found to be 0.5–5%. When less than 0.1% sodium ion is present, the backside color is not eliminated. If more than 10% of the metal ion becomes available, the properties (i.e., mechanical strength) of the glass surface are adversely affected. Consequently, amounts higher than this will cause inferior glass surfaces which would be very unacceptable in the automotive industry.

The particular metal used in the metallizing compositions of this invention is silver. However, this is not to exclude other metals such as palladium or platinum which also may be included alone or together with the silver. In order to obtain the desirable conductivity, approximately 40–95% metal should be included in the metallizing composition.

The inorganic binder, which should be present in amounts ranging from 2–20% by weight, can be any of the conventional binders used heretofore. Enough binder must be used to provide adequate adhesion while more than 20% binder will unduly increase the resistivity of the fired metallization. The inorganic binder can be any of the well-known glass frits used in compositions of this general type. Such frits are generally prepared by melting a glass batch composed of the desired metal oxides, or compounds which will produce the glass during melting, and pouring the melt into water. The coarse frit is then milled to a powder of the desired fineness. In addition, $Bi_2O_3$ may be present in the inorganic binder together with the glass or as a constituent of the glass frit. The patents to Larsen and Short, U.S. Pat. 2,822,279 and to Hoffman, U.S. Pat. 3,207,706, describe some frit compositions which may be employed. Other typical inorganic binders include borates, silicates, and borosilicate glasses.

The ratio of silver:inorganic binder can be adjusted to produce the desired conductivity. It has been found that a ratio from 5:1 to 40:1 produces good conductivity. However, this is not intended to exclude the use of other ratios which produce acceptable results.

The metallizing compositions of the invention will usually, although not necessarily, be dispersed in an inert liquid vehicle to form a paint or paste for the application to various substrates. The proportion of vehicle to metallizing composition may vary considerably depending upon the manner in which the paint or paste is to be applied and the kind of vehicle used. Generally, from 1–20 parts by weight of the metallizing composition (metal, inorganic binder and metal salts) per part by weight of vehicle will be used to produce a paint or paste of the desired consistency. Preferably, 3–10 parts solids per part of vehicle will be used.

Any liquid, preferably inert, may be employed as the vehicle. Water or various organic liquids, with or without thickening and/or stabilizing agents, and other common additives may be utilized as the vehicle. Examples of organic liquids that can be used are the higher alcohols such as decanol; esters of such alcohols, as for example, the acetates and propionates; the terpenes such as pine oil, alpha- and beta-terpineol and the like; and solutions of resins such as polymethacrylates of lower alcohols, or solutions of ethyl cellulose, in solvents such as pine oil and the monobutyl ether of ethylene glycol mono-acetate (butyl—O—$CH_2$—$CH_2$—$OCOCH_3$). The vehicles of 617,885, filed Feb. 23, 1967 may be used. The vehicle may contain or be composed of volatile liquids to promote fast setting after application, or it may contain waxes, thermoplastic resins or the like materials which are thermofluid so that the vehicle-containing composition may be applied at an elevated temperature to a relatively cold ceramic body upon which the composition sets immediately.

Application of the metallizing composition in a paint or paste form to the substrate may be effected in any desired manner. It will generally be desired, however, to effect the application in precise pattern form, which can be readily done by applying well-known screen stencil techniques or methods. The resulting print or pattern will then be fired in the usual manner at a temperature within the range of 500–800° C. It should be pointed out that the firing temperature and firing time are important variables in applying the silver compositions of this invention to particular substrates. Various types of glass surfaces require particular firing conditions. In all situations though, the backside color is considerably lighter if not completely eliminated by the use of the metallizing compositions of this invention.

The invention is illustrated by the following examples. In the examples and elsewhere in the specification, all parts, ratios and percentages of materials or components are by weight.

EXAMPLE 1

A conventional silver composition comprising 90% finely divided silver and 10% finely divided glass (65% PbO, 34% $SiO_2$ and 1% $Al_2O_3$) was dispersed in an inert liquid vehicle (10% ethyl cellulose and 90% beta-terpineol). The ratio of solids:liquid was 4:1. This metallizing composition was screen printed onto a conventional window glass ($Na_2O \cdot CaO \cdot SiO_2$) in the form of lines (30 mils wide and 1⅛ inch apart), and fired for 7 minutes at 650° C. The backside color of the fired silver metallization was a yellowish brown.

EXAMPLE 2

A metallizing composition comprising 85% finely divided silver, 9% of the same glass used in Example 1 and 6% sodium carbonate was dispersed in an inert vehicle as described in Example 1. This composition was also applied to the same window glass and fired under the same conditions. The objectionable yellow brownish backside color was not present. In contrast, a silvery gray color was observed on the backside while a silver-white color was displayed on the front side. In addition, the electrical resistivity, solderability, adhesion and the overall strength of the glass window were determined to be within the prescribed limits which are acceptable to the automotive industry.

Thus, the metallizing compositions of this invention offer all of the advantages of the prior metallizing compositions but without the objectionable backside color. The silvery appearance displayed by the present fired metallizations are considered to be acceptable for automotive consumer purposes.

I claim:

1. A metallizing composition consisting essentially of, (A) 40–95% by weight silver, (B) 2–20% by weight inorganic binder, and (C) a salt selected from the group consisting of alkali metal salts, alkaline earth metal salts, and mixtures thereof, said salt being present in amounts which yield, based on the weight of the metallizing composition, 0.1–10% of the metal ion upon firing.

2. A metallizing composition in accordance with claim 1 which contains an inert liquid vehicle.

3. A metallizing composition in accordance with claim 1 wherein the silver:inorganic binder ratio is from 5:1 to 40:1.

4. A metallizing composition consisting essentially of, (A) 40–95% by weight silver, (B) 2–20% by weight inorganic binder, and (C) an alkali metal salt, said salt being present in amounts which yield, based on the weight of the metallizing composition, 0.5–5% of the metal ion upon firing.

5. A metallizing composition consisting essentially of, (A) 40–95% by weight silver, (B) 2–20% by weight inorganic binder, and (C) a salt selected from the group consisting of sodium carbonate, sodium oxalate and mixtures thereof.

6. A metallizing composition in accordance with claim 5 which contains an inert liquid vehicle.

7. A metallizing composition in accordance with claim 4 wherein the silver:inorganic binder ratio is from 5:1 to 40:1.

8. A glass substrate having the metallizing composition of claim 1 fired thereon.

9. A glass substrate having the metallizing composition of claim 4 fired thereon.

10. A glass substrate having the metallizing composition of claim 5 fired thereon.

11. A metallizing composition in accordance with claim 1 wherein salt (C) is selected from the group consisting of potassium carbonate, potassium oxalate and mixtures thereof.

12. A metallizing composition in accordance with claim 1 wherein salt (C) is sodium bicarbonate.

References Cited

UNITED STATES PATENTS

| | | | |
|---|---|---|---|
| 2,822,279 | 2/1958 | Larsen et al. | 252—514 |
| 2,837,487 | 6/1958 | Huttar | 252—514 |
| 3,352,797 | 11/1967 | Kim | 252—514 |
| 3,416,960 | 12/1968 | Kelley et al. | 117—229 |
| 3,248,345 | 4/1966 | Mones et al. | 252—514 |

DOUGLAS J. DRUMMOND, Primary Examiner

U.S. Cl. X.R.

252—521; 117—355, 223, 227, 229